(12) United States Patent
Hulst

(10) Patent No.: US 8,776,435 B2
(45) Date of Patent: Jul. 15, 2014

(54) WINDOW ASSEMBLY FOR VEHICLE

(71) Applicant: Magna Mirrors of America, Inc., Holland, MI (US)

(72) Inventor: Michael J. Hulst, Holland, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 13/912,237

(22) Filed: Jun. 7, 2013

(65) Prior Publication Data

US 2014/0007509 A1  Jan. 9, 2014

Related U.S. Application Data

(60) Provisional application No. 61/667,542, filed on Jul. 3, 2012.

(51) Int. Cl.
*B60J 1/17* (2006.01)
*E05F 11/38* (2006.01)

(52) U.S. Cl.
USPC ............. 49/128; 49/213; 49/125; 296/146.16

(58) Field of Classification Search
USPC ........... 49/209, 213, 214, 125, 127, 128, 129, 49/141, 449; 296/201, 146.16, 155
See application file for complete search history.

(56) References Cited

U.S. PATENT DOCUMENTS

| | | | |
|---|---|---|---|
| 1,637,367 A | 8/1927 | Zimmers et al. | |
| 2,023,699 A | 12/1935 | Robinson | |
| 2,255,725 A * | 9/1941 | Trescher | 49/141 |
| 2,455,462 A * | 12/1948 | Bader et al. | 52/204.51 |
| 2,502,320 A | 3/1950 | Guernsey | |
| 2,762,648 A | 9/1956 | Huzzard | |
| 2,772,915 A | 12/1956 | Renno | |
| 2,814,525 A | 11/1957 | Thomas | |
| 2,820,992 A | 1/1958 | Clayton-Wright | |
| 3,186,755 A | 6/1965 | Ward | |
| 3,283,455 A | 11/1966 | Riegelman | |
| 3,442,059 A | 5/1969 | Kessler | |
| 3,742,649 A | 7/1973 | Dochnahl | |
| 4,042,004 A | 8/1977 | Kwan | |

(Continued)

FOREIGN PATENT DOCUMENTS

| | | |
|---|---|---|
| DE | 3118559 | 11/1982 |
| EP | 968862 | 1/2000 |
| FR | 1166064 | 11/1958 |
| JP | 06040251 | 2/1994 |

*Primary Examiner* — Katherine Mitchell
*Assistant Examiner* — Justin Rephann
(74) *Attorney, Agent, or Firm* — Gardner, Linn, Burkhart & Flory, LLP

(57) ABSTRACT

A vehicular window assembly includes a frame, a fixed window panel bonded to a lower frame portion and a movable window assembly. The side frame members of the movable window include upper and lower guide elements that are slidably received in respective channels along opposite portions of the frame. The channels are configured to move the movable window along the fixed window panel when the movable window assembly is at least partially opened and to move the movable window to a position where the movable window panel is generally coplanar with the fixed window panel when the movable window assembly is closed. When the movable window is in its closed position, a seal sealingly engages an inboard surface of the side frame members and an inboard surface of the upper frame member and an inboard portion of an upper perimeter region of the fixed window panel.

20 Claims, 10 Drawing Sheets

(56) References Cited

U.S. PATENT DOCUMENTS

| | | | |
|---|---|---|---|
| 4,072,338 A | 2/1978 | Lawrence et al. | |
| 4,119,341 A | 10/1978 | Cook | |
| 4,343,121 A | 8/1982 | Kruschwitz | |
| 4,364,214 A | 12/1982 | Morgan et al. | |
| 4,364,595 A | 12/1982 | Morgan et al. | |
| 4,405,175 A | 9/1983 | Hoffmann | |
| 4,431,228 A | 2/1984 | Grise | |
| 4,454,688 A | 6/1984 | Rest et al. | |
| 4,530,192 A | 7/1985 | Ginster | |
| 4,561,224 A | 12/1985 | Jelens | |
| 4,604,830 A | 8/1986 | Maeda et al. | |
| 4,608,779 A | 9/1986 | Maeda et al. | |
| 4,619,479 A | 10/1986 | Martin, Jr. | |
| 4,656,784 A | 4/1987 | Brachmann | |
| 4,703,598 A | 11/1987 | Wilson et al. | |
| 4,785,583 A | 11/1988 | Kawagoe et al. | |
| 4,793,099 A | 12/1988 | Friese et al. | |
| 4,833,847 A | 5/1989 | Inayama et al. | |
| 4,875,307 A | 10/1989 | Barbero | |
| 4,932,161 A | 6/1990 | Keys et al. | |
| 5,040,333 A | 8/1991 | Mesnel et al. | |
| 5,054,242 A | 10/1991 | Keys et al. | |
| 5,069,497 A | 12/1991 | Clelland | |
| 5,139,307 A | 8/1992 | Koops et al. | |
| 5,169,205 A * | 12/1992 | James | 296/146.16 |
| 5,228,740 A | 7/1993 | Saltzman | |
| 5,273,338 A | 12/1993 | Gooding et al. | |
| 5,345,717 A | 9/1994 | Mori et al. | |
| 5,345,719 A | 9/1994 | Karwande | |
| 5,355,651 A | 10/1994 | Correia | |
| 5,421,125 A | 6/1995 | Camp et al. | |
| 5,429,844 A | 7/1995 | Galardi | |
| 5,441,688 A | 8/1995 | Goto et al. | |
| 5,442,880 A | 8/1995 | Gipson | |
| 5,456,049 A | 10/1995 | Goto et al. | |
| 5,522,191 A | 6/1996 | Wenner et al. | |
| 5,542,214 A * | 8/1996 | Buening | 49/380 |
| 5,551,197 A | 9/1996 | Repp et al. | |
| 5,566,510 A | 10/1996 | Hollingshead et al. | |
| 5,584,526 A | 12/1996 | Soldner | |
| 5,688,016 A | 11/1997 | Gold | |
| 5,702,148 A | 12/1997 | Vaughan et al. | |
| 5,704,173 A | 1/1998 | Repp et al. | |
| 5,732,509 A | 3/1998 | Buehler et al. | |
| 5,735,089 A | 4/1998 | Smith et al. | |
| 5,743,047 A | 4/1998 | Bonne et al. | |
| 5,752,352 A | 5/1998 | Goto et al. | |
| 5,758,459 A | 6/1998 | Koike et al. | |
| 5,779,956 A | 7/1998 | Hollingshead et al. | |
| 5,791,088 A | 8/1998 | Martinelli et al. | |
| 5,799,444 A | 9/1998 | Freimark et al. | |
| 5,803,527 A | 9/1998 | Fujiya | |
| 5,806,257 A | 9/1998 | Cornils et al. | |
| 5,809,706 A * | 9/1998 | Neaux | 52/204.51 |
| 5,809,707 A | 9/1998 | Bargados | |
| 5,846,463 A | 12/1998 | Keeney et al. | |
| 5,853,895 A | 12/1998 | Lewno | |
| 5,935,356 A | 8/1999 | Soldner | |
| 5,966,874 A | 10/1999 | Repp et al. | |
| 5,988,730 A | 11/1999 | Bekaert | |
| 5,996,284 A | 12/1999 | Freimark et al. | |
| 5,996,285 A | 12/1999 | Guillemet et al. | |
| 6,030,020 A | 2/2000 | Malm | |
| 6,068,719 A | 5/2000 | Lewno | |
| 6,082,674 A | 7/2000 | White et al. | |
| 6,128,860 A | 10/2000 | Repp et al. | |
| 6,134,851 A | 10/2000 | Roze et al. | |
| 6,138,414 A | 10/2000 | Ohmori et al. | |
| 6,206,453 B1 | 3/2001 | Farrar et al. | |
| 6,220,650 B1 | 4/2001 | Davis et al. | |
| 6,224,136 B1 | 5/2001 | Takagi | |
| 6,227,598 B1 | 5/2001 | Ichioka et al. | |
| 6,279,266 B1 * | 8/2001 | Searcy | 49/183 |
| 6,286,891 B1 | 9/2001 | Gage et al. | |
| 6,287,402 B2 | 9/2001 | Soldner | |
| 6,298,606 B1 | 10/2001 | Repp et al. | |
| 6,299,235 B1 | 10/2001 | Davis et al. | |
| 6,312,043 B1 | 11/2001 | Blackburn et al. | |
| 6,319,344 B1 | 11/2001 | Lewno | |
| 6,389,763 B1 | 5/2002 | Clauss | |
| 6,394,529 B2 | 5/2002 | Davis et al. | |
| 6,409,244 B1 | 6/2002 | Nagahashi et al. | |
| 6,425,215 B2 | 7/2002 | Farrar | |
| 6,572,176 B2 | 6/2003 | Davis et al. | |
| 6,585,311 B2 | 7/2003 | Farrar et al. | |
| 6,591,552 B1 | 7/2003 | Rasmussen | |
| 6,669,267 B1 | 12/2003 | Lynam et al. | |
| 6,685,254 B2 | 2/2004 | Emmons et al. | |
| 6,691,464 B2 | 2/2004 | Nestell et al. | |
| 6,729,031 B2 | 5/2004 | McKee | |
| 6,729,674 B2 | 5/2004 | Davis et al. | |
| 6,793,269 B2 | 9/2004 | Pugh et al. | |
| 6,817,144 B1 | 11/2004 | Tavivian | |
| 6,826,883 B2 | 12/2004 | Guzman et al. | |
| 6,830,290 B2 | 12/2004 | DeGaillard | |
| 6,846,039 B2 | 1/2005 | Lewno | |
| 6,869,128 B2 | 3/2005 | Farrar et al. | |
| 6,902,224 B2 | 6/2005 | Weinert et al. | |
| 7,003,916 B2 | 2/2006 | Nestell et al. | |
| 7,073,293 B2 | 7/2006 | Galer | |
| 7,097,232 B2 | 8/2006 | Beaudry et al. | |
| 7,146,769 B1 | 12/2006 | Culverson | |
| 7,152,906 B1 | 12/2006 | Farrer et al. | |
| 7,155,862 B2 | 1/2007 | Bourque et al. | |
| 7,210,729 B2 | 5/2007 | Hammaker et al. | |
| 7,219,470 B2 | 5/2007 | Lahnala | |
| 7,287,802 B2 | 10/2007 | Dankert et al. | |
| 7,305,766 B1 | 12/2007 | Timmermans | |
| 7,332,225 B2 | 2/2008 | Lewno | |
| 7,390,051 B2 * | 6/2008 | Bruntz et al. | 296/146.16 |
| 7,393,042 B2 * | 7/2008 | Alfstad-Seibel et al. | 296/146.16 |
| 7,427,096 B2 * | 9/2008 | Snider et al. | 296/146.16 |
| RE40,636 E | 2/2009 | Weinert et al. | |
| 7,568,316 B2 | 8/2009 | Choby et al. | |
| 7,571,568 B2 | 8/2009 | Ito et al. | |
| 7,584,574 B2 * | 9/2009 | Kinross et al. | 49/413 |
| 7,641,265 B2 * | 1/2010 | Seiple et al. | 296/190.1 |
| 7,703,836 B2 * | 4/2010 | Snider et al. | 296/146.16 |
| RE41,502 E * | 8/2010 | Neaux | 52/204.51 |
| 7,789,450 B2 * | 9/2010 | Seiple et al. | 296/146.15 |
| 7,838,115 B2 | 11/2010 | Lewno | |
| 7,980,027 B2 * | 7/2011 | Kraus et al. | 49/209 |
| 8,186,103 B2 * | 5/2012 | Grimm et al. | 49/213 |
| 8,245,462 B2 | 8/2012 | Miethe et al. | |
| 8,246,101 B2 | 8/2012 | Cicala | |
| 8,250,812 B2 | 8/2012 | Hebert et al. | |
| 8,272,168 B2 | 9/2012 | Lahnala | |
| 8,316,583 B2 | 11/2012 | Lahnala | |
| 8,322,073 B2 | 12/2012 | Lewno | |
| 8,322,075 B2 | 12/2012 | Lahnala | |
| 8,375,646 B2 * | 2/2013 | Newkirk et al. | 52/29 |
| 8,388,043 B2 | 3/2013 | Lahnala | |
| 8,495,841 B2 * | 7/2013 | DeGroff | 52/207 |
| 2002/0095868 A1 | 7/2002 | McCauley et al. | |
| 2002/0117874 A1 | 8/2002 | Taylor | |
| 2003/0070371 A1 | 4/2003 | Kobrehel | |
| 2003/0137161 A1 | 7/2003 | Gillen | |
| 2003/0182865 A1 | 10/2003 | Nestell et al. | |
| 2003/0209922 A1 | 11/2003 | Emmons et al. | |
| 2003/0213179 A1 | 11/2003 | Galer | |
| 2004/0020131 A1 | 2/2004 | Galer et al. | |
| 2004/0100121 A1 | 5/2004 | Bourque et al. | |
| 2005/0076573 A1 | 4/2005 | Rivera | |
| 2005/0161975 A1 | 7/2005 | Nieminiski et al. | |
| 2006/0059799 A1 | 3/2006 | Zimmer et al. | |
| 2006/0101738 A1 | 5/2006 | Lethers et al. | |
| 2006/0107600 A1 | 5/2006 | Nestell et al. | |
| 2007/0157522 A1 | 7/2007 | Hebert et al. | |
| 2007/0234644 A1 * | 10/2007 | Jaeger et al. | 49/362 |
| 2008/0122262 A1 | 5/2008 | Cicala | |
| 2008/0216410 A1 * | 9/2008 | Lahnala | 49/374 |
| 2009/0183434 A1 * | 7/2009 | Puotunen | 49/209 |
| 2009/0250975 A1 * | 10/2009 | Arimoto | 296/201 |
| 2009/0256398 A1 | 10/2009 | Ota | |

(56) References Cited

U.S. PATENT DOCUMENTS

| | | |
|---|---|---|
| 2009/0309391 A1 | 12/2009 | Krause |
| 2010/0102597 A1 | 4/2010 | Ellis |
| 2011/0192091 A1* | 8/2011 | Smith et al. .............. 49/490.1 |
| 2012/0068500 A1 | 3/2012 | Nania |
| 2012/0279136 A1 | 11/2012 | Miethe et al. |
| 2013/0174488 A1 | 7/2013 | Snider et al. |

* cited by examiner

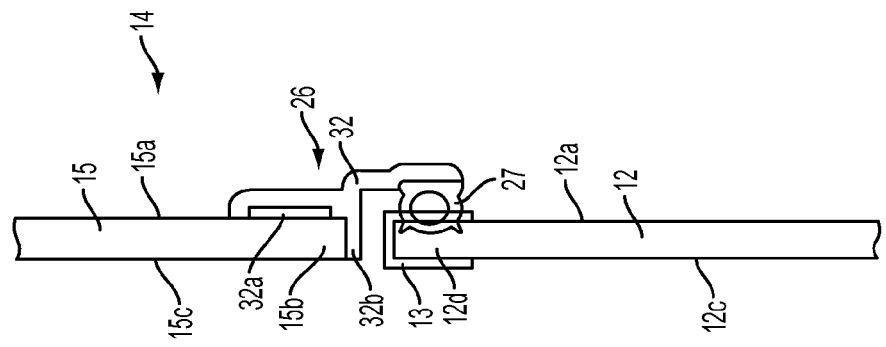
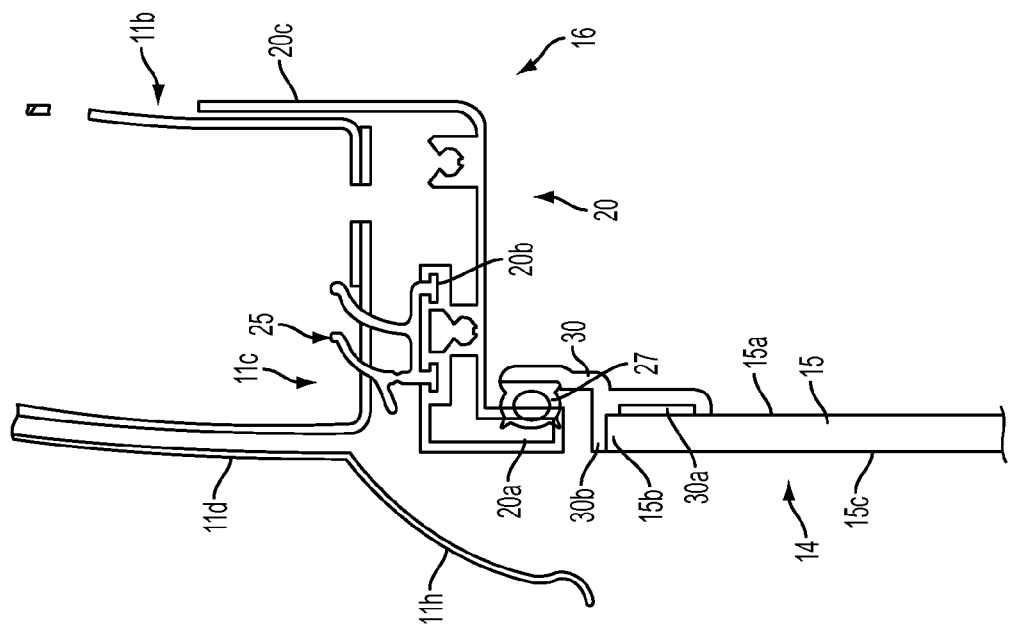

WINDOW ASSEMBLY FOR VEHICLE

CROSS REFERENCE TO RELATED APPLICATION

The present application claims the filing benefit of U.S. provisional application, Ser. No. 61/667,542, filed Jul. 3, 2012, which is hereby incorporated herein by reference in its entirety.

FIELD OF THE INVENTION

The present invention relates to windows for vehicles and, more particularly, to window assemblies including window panels and frames for transit vehicles, such as school buses or the like.

BACKGROUND OF THE INVENTION

Vehicle window assemblies, such as for school buses and the like, typically include a frame that includes four aluminum side frame portions that are screwed or fastened together at the corners of the frame. The window panels, typically one fixed window panel and one movable window panel, are retained within channels along the frame portions while the frame portions are fastened together to form the window assembly.

SUMMARY OF THE INVENTION

The present invention provides a window assembly or window module or window unit for a vehicle, such as a transit vehicle or school bus, that includes a frame and a fixed window panel partially encapsulated or surrounded by the frame and a movable window assembly or unit that includes a movable window panel encompassed or surrounded by a movable frame and that is movable relative to the frame and the fixed window panel between opened and closed positions. The movable frame is bonded about the periphery of the inner surface of the movable window panel and may not overlap or overlay the outer surface of the movable window panel. The movable window assembly or unit includes upper and lower guide elements at each side of the movable window frame, and the guide elements are received in respective channels along opposite sides of the fixed window frame. The channels are curved at the upper ends thereof to guide the movable window panel into a closed position where the movable window panel is generally flush or coplanar with the fixed window panel.

These and other objects, advantages, purposes and features of the present invention will become apparent upon review of the following specification in conjunction with the drawings.

BRIEF DESCRIPTION OF THE DRAWINGS

FIG. 7A is a sectional view of an upper cross rail of the movable window, taken along the line A-A in FIG. 7;

FIG. 7B is a sectional view of a lower cross rail of the movable window, taken along the line B-B in FIG. 7;

DESCRIPTION OF THE PREFERRED EMBODIMENTS

Figure 1:
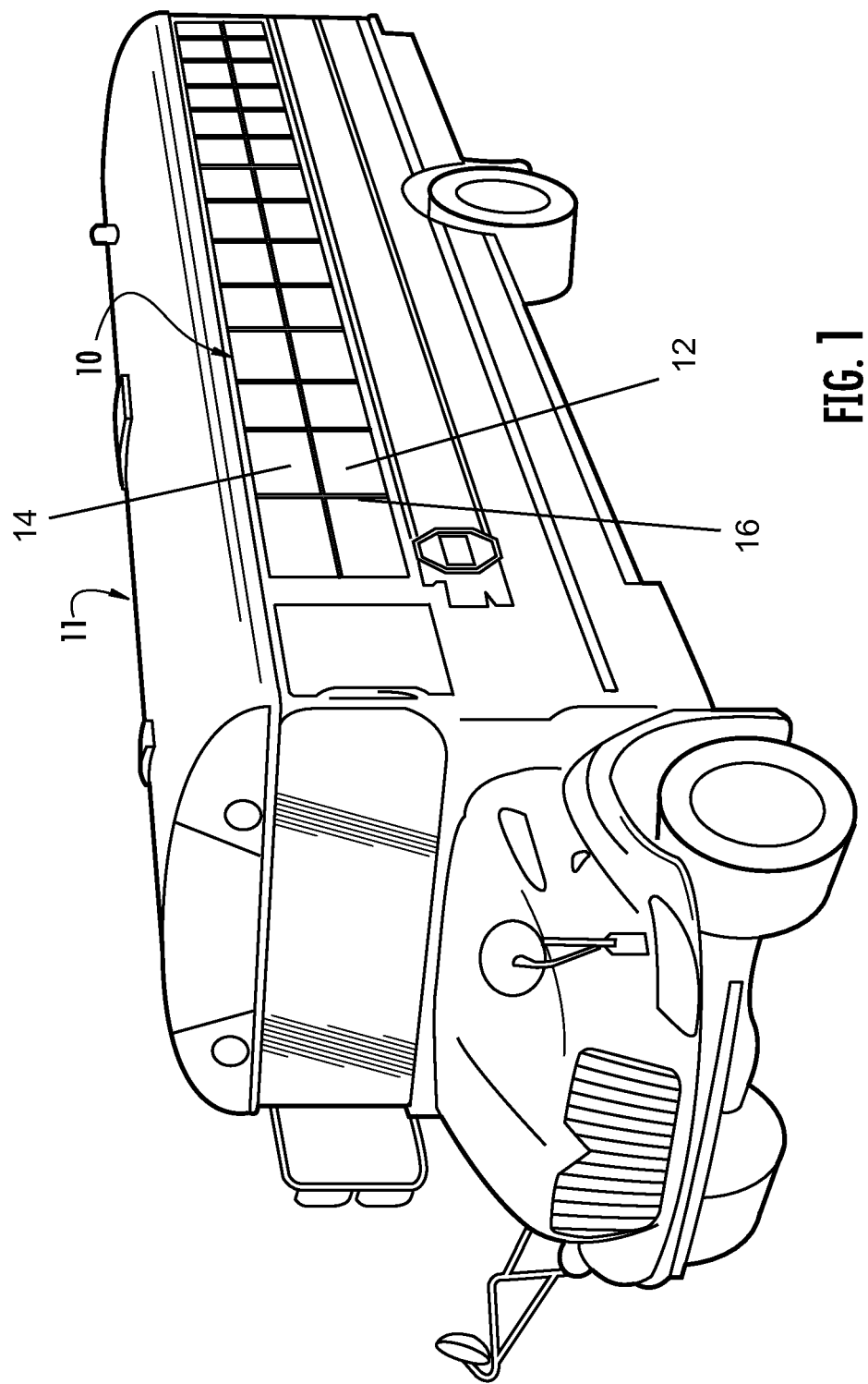
FIG. 1 is a perspective view of a school bus incorporating a plurality of window assemblies in accordance with the present invention.

Referring now to the drawings and the illustrative embodiments depicted therein, a window assembly or window module or window unit 10 may be mounted at an opening of a transit vehicle, such as a school bus 11 or the like (FIG. 1). Window assembly 10 comprises a modular window assembly that includes a fixed window pane or panel 12 fixedly attached to a perimeter frame 16, and a movable or slidable window unit or assembly 14 that includes and supports a movable window pane or panel 15 and that slides or moves along perimeter frame 16, and that moves generally vertically relative to the fixed window panel 12 to open and close the window assembly. As shown in FIG. 1, a plurality of window assemblies or modules 10 are installed along the side of the school bus. The window assemblies may be closely spaced next to one another and may provide a substantially continuous, flush row of window panels along the sides of the school bus. The fixed window panel and movable window panel may comprise any suitable material, such as glass or polycarbonate panels or substrates or the like, without affecting the scope of the present invention. The window assembly includes a perimeter fixed frame with a fixed window panel bonded to the frame at a portion of the frame (such as a lower portion of the frame) and with a movable window panel bonded to a movable frame and movable along the perimeter fixed frame, as discussed below. The movable window unit 14 is movable along the perimeter frame and relative to the fixed window panel between an opened position, where the movable window panel is disposed inward of the fixed window panel, and a closed position, where the movable window panel is generally flush with or coplanar with the fixed window panel and the sheet metal of the transit vehicle or school bus, as also discussed below.

Figure 2:
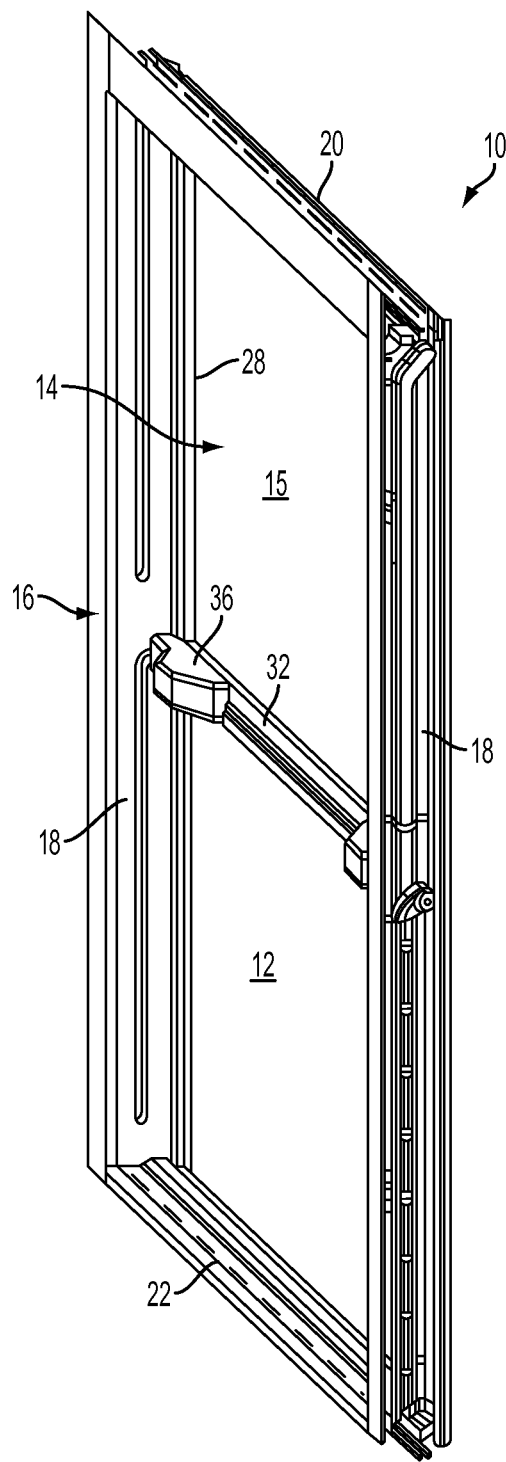
FIG. 2 is a perspective view of a window assembly having a movable window that is movable along the side channels of the window assembly in accordance with the present invention.
Figure 3:
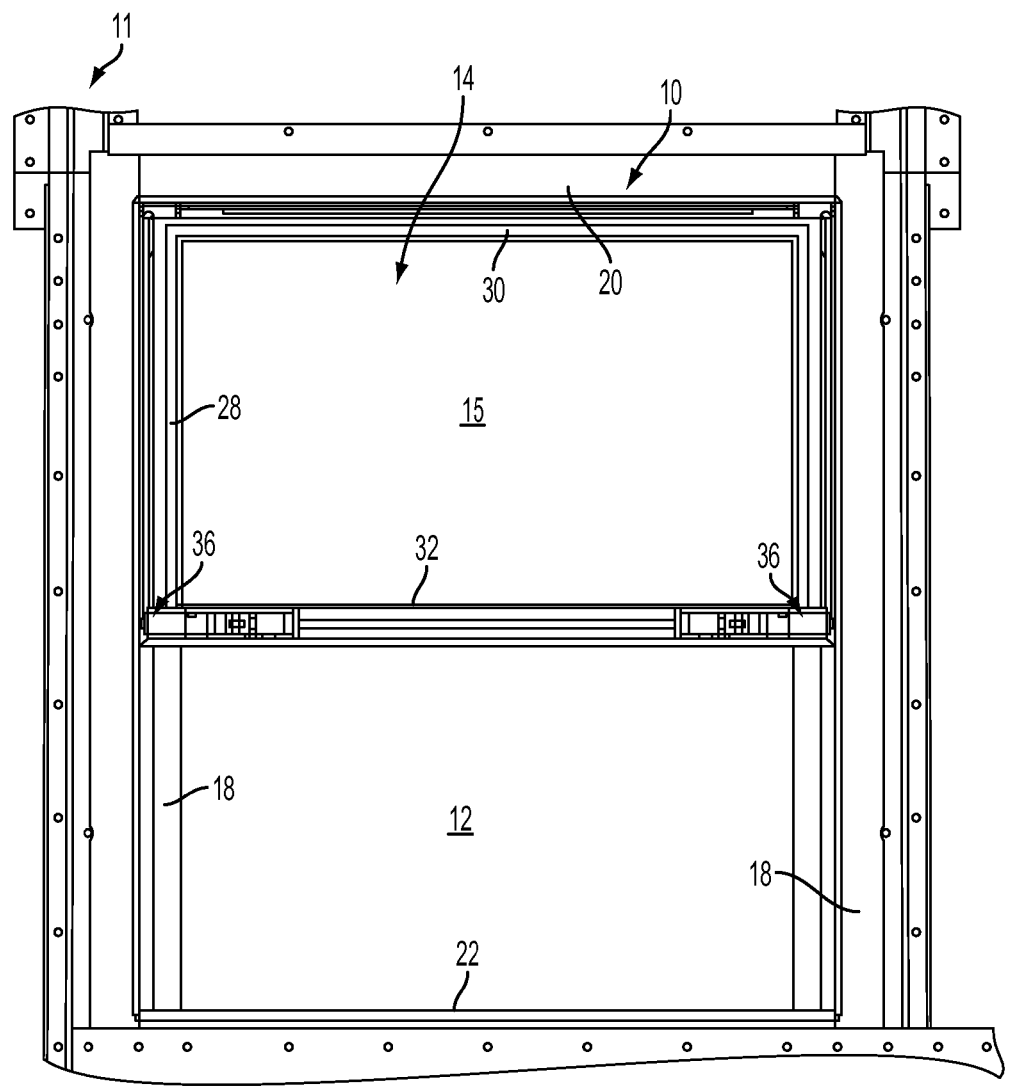
FIG. 3 is an inside plan view of the window assembly of FIG. 2.
Figure 4:
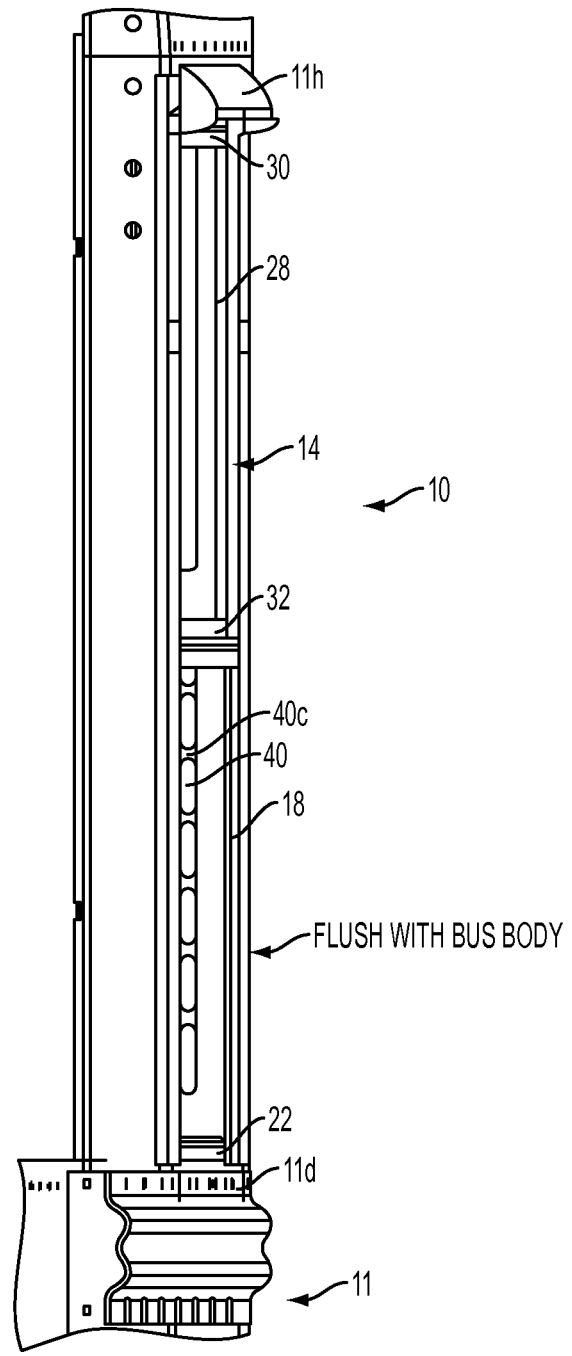
FIG. 4 is a perspective view of the window assembly of the present invention, shown mounted at the school bus.
Figure 5:
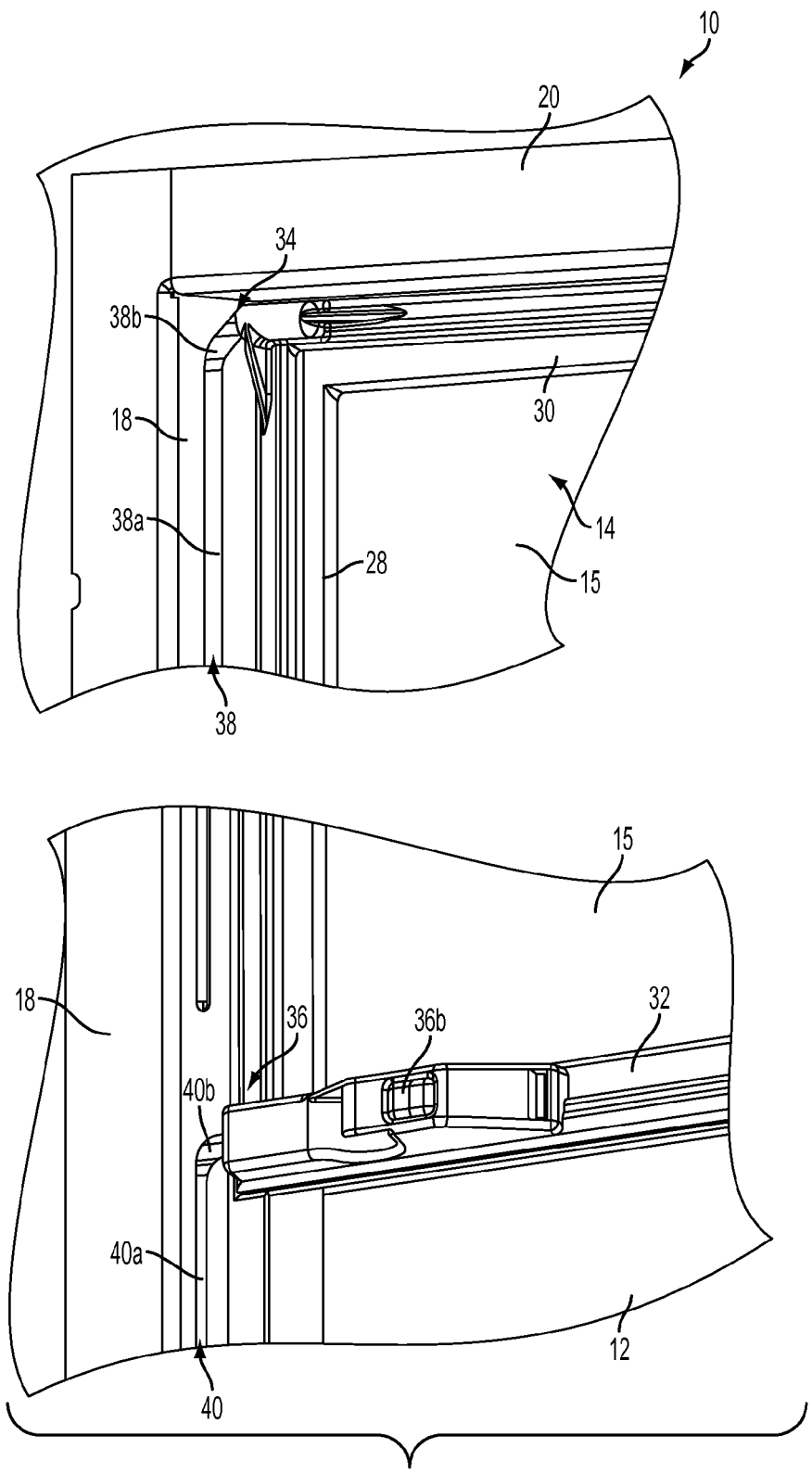
FIG. 5 is an enlarged perspective view of the side channels of the window assembly with the guide elements of the movable window panel received therein, in accordance with the present invention.

As shown in FIGS. 2-4, perimeter frame 16 includes a pair of generally vertical channel members or side frame members or split sash side rails 18 (which may comprise aluminum or plastic or polymeric extruded frame members) and a generally horizontal upper channel or frame member 20 (which may comprise an aluminum or plastic or polymeric extruded frame member) and a generally horizontal lower channel or frame member 22 (which may comprise an aluminum or plastic or polymeric extruded frame member). The frame members may be formed of any suitable material, and may be molded or extruded to the desired form (if each member is extruded, the ends of adjacent members may be joined together, such as via ultrasonic welding or bonding or the like). For example, the perimeter frame or fixed frame may comprise a substantially rigid material, such as a substantially rigid polymeric or plastic material, such as glass filled nylon, PVC, polyethylene terephthalate (PET), polypropylene, nylon, acrylonitrile-butadeine-styrene (ABS) or thermoplastic urethane (TPU) or the like. The perimeter frame may also or otherwise comprise, for example, a metallic material or a composite material, such as a filled polymeric or a metal member that is encapsulated in plastic or the like. The side frame members may slidably or movably support the movable window unit or assembly 14. In the illustrated embodiment, the upper and lower frame members comprise a metallic material (such as extruded aluminum or the like) and the generally vertical side frame members comprise a plastic or polymeric material (such as a molded or extruded plastic material or the like).

Optionally, the window assembly 10 may utilize aspects of the window assemblies described in U.S. Pat. No. 7,427,096 and/or U.S. patent application Ser. No. 12/850,871, filed Aug. 5, 2010, and/or PCT Application No. PCT/US2011/051506, filed Sep. 13, 2011 and published Mar. 22, 2012 as International Publication No. WO2012/037190, which are hereby incorporated herein by reference in their entireties. Although shown and described as having a vertically movable window that is movable relative to a single fixed window panel, it is envisioned that aspects of the present invention may be suitable for use in other types of window assemblies having movable windows, such as horizontally movable windows or other vertically movable windows such as those described in U.S. Pat. No. 7,427,096, which is hereby incorporated herein by reference in its entirety.

In the illustrated embodiment, perimeter frame 16 fixedly supports fixed window panel 12 at a lower region or portion or half of the window assembly 10. As shown in FIGS. 7C and 7E, fixed window panel 12 is bonded to the generally vertical side frame members 18 and the lower frame member 22, whereby the frame members 18, 22 are bonded (at respective attaching or bonding surfaces or channels or recesses 18a, 22a) at an inner surface 12a of window panel 12 and may include edge tabs or portions 18b, 22b that encompass the respective perimeter edge dimension 12b of the window panel 12, but do not encompass or overlay any portion of the outer surface 12c of window panel 12. The side frame members 18 are formed with the attaching surface or channel or recess 18a at the lower portion thereof and with a sealing flange 18c (FIG. 7A) at the upper portion of thereof for sealing against the seal of the movable window unit when the movable window unit is closed. A sealing flange 20a is also established at the upper frame member 20 for sealing against the seal of the movable window unit when the movable window unit is closed, as discussed below.

Figure 7:
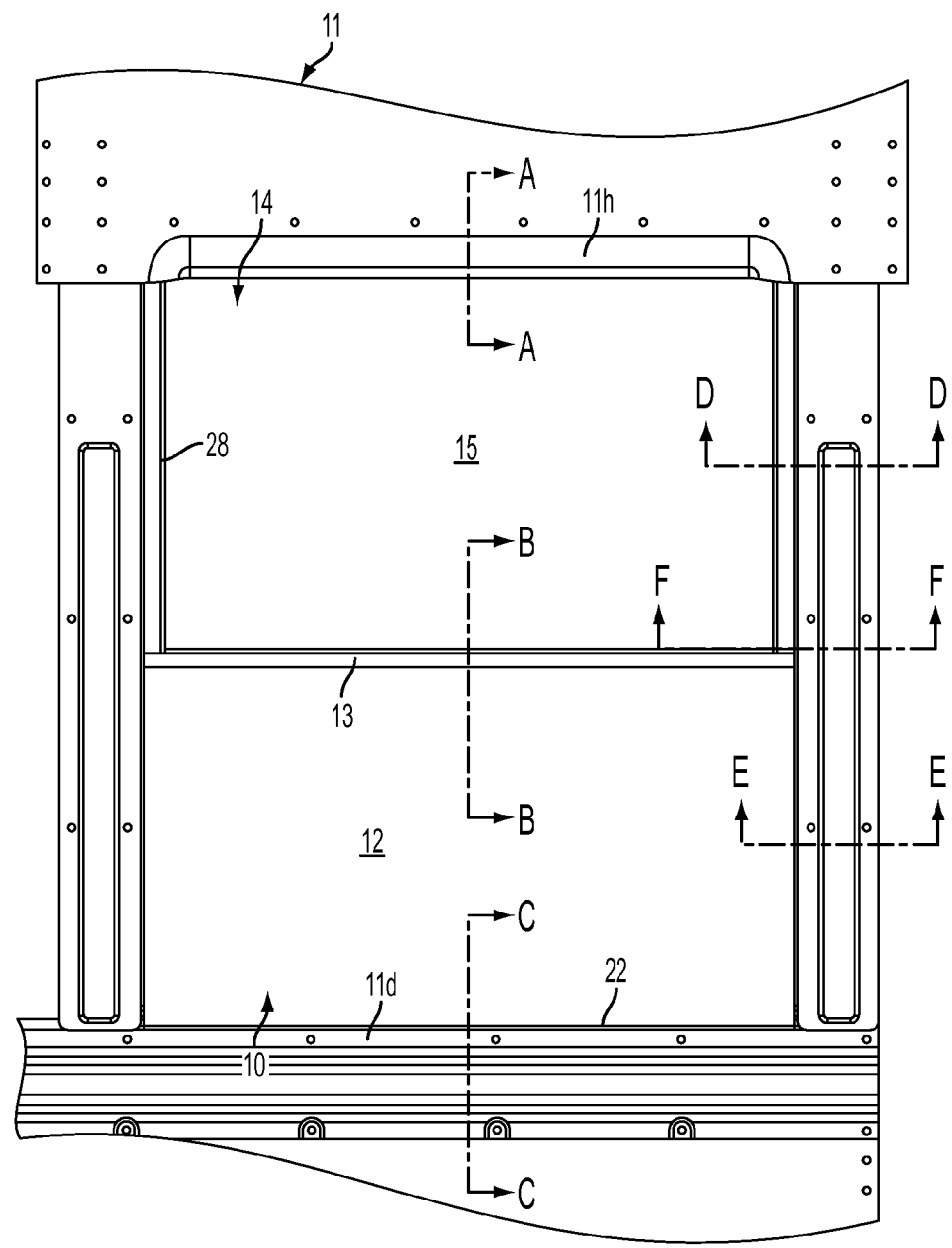
FIG. 7 is an outside plan view of the window assembly of the present invention.
Figure 7C:
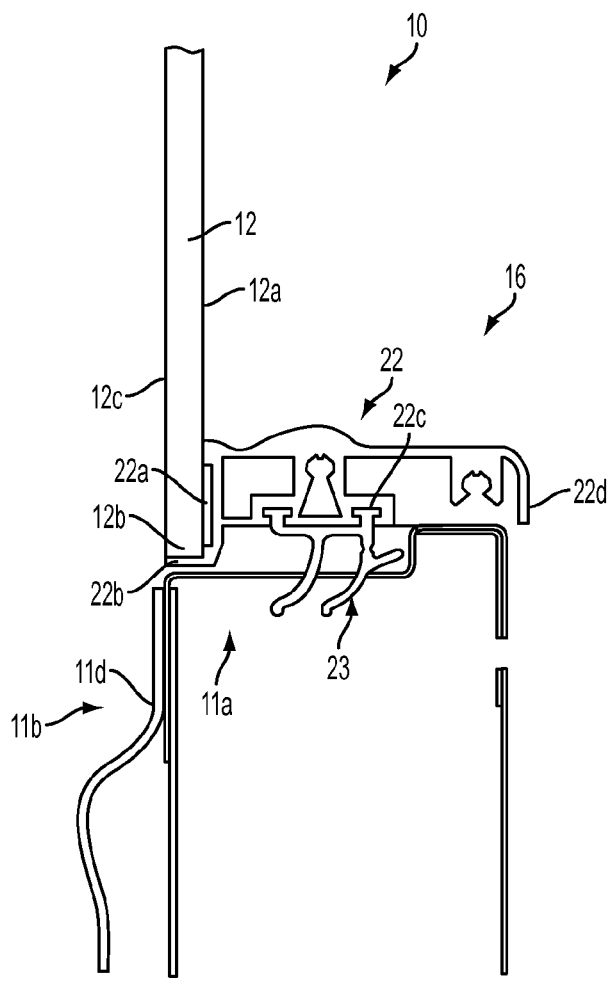
FIG. 7C is a sectional view of the lower cross rail of the fixed window, taken along the line C-C in FIG. 7.

Optionally, and as shown in FIG. 7B, the upper perimeter edge region 12d of fixed window panel 12 may not be bonded to any frame member and may include an encapsulation or extrusion or wrapping element 13 that encapsulates or overlays or wraps around and along the upper perimeter edge of the fixed window panel that may otherwise be exposed when the window assembly is installed at the transit vehicle. Such an encapsulation or extrusion (which may comprise a metallic material, such as aluminum or the like, or a plastic or polymeric material) may be provided to meet safety regulations for glass windows in transit vehicles and the like.

As shown in FIG. 7C, the lower frame member 22 is formed to mount at a lower portion 11a of the vehicle sheet metal 11b established at an opening or aperture of the vehicle, and includes a seal or sealing element 23 disposed therealong (such as a double lip seal that is received in or extruded along one or more channels or receiving portions 22c of lower frame member 22 and that flexes when the window assembly is attached at the vehicle, as discussed below). Similarly, and as shown in FIG. 7A, the upper frame member 20 is formed to mount at an upper portion 11c of the vehicle sheet metal 11b established at the opening or aperture of the vehicle, and includes a seal or sealing element 25 disposed therealong (such as a double lip seal that is received in or extruded along one or more channels or receiving portions 20b of lower frame member 20 and that flexes when the window assembly is attached at the vehicle, as also discussed below).

In the illustrated embodiment, movable window or window assembly 14 includes a glass or plastic window panel 15 that is surrounded by a movable frame 26. Movable frame 26 comprises a plastic or polymeric frame that includes a pair of generally vertical side slide rails or frame members 28 (FIGS. 2C and 3) and a generally horizontal upper channel or frame member 30 and a generally horizontal lower channel or frame member 32. The movable frame 26 is bonded to an inner surface 15a of the movable window panel 15 about the periphery of the movable window panel 15. In the illustrated embodiment, and as shown in FIGS. 7A, 7B, 7D and 7F, the frame members 28, 30, 32 are bonded at an inner surface 15a of window panel 15 (via respective attaching or bonding surfaces or channels or recesses 28a, 30a, 32a) and may include a lip or tab 28b, 30b, 32b that encompasses the respective perimeter edge dimension 15b of the movable window panel 15, but does not encompass or overlay any portion of the outer surface 15c of window panel 15. As shown in FIGS. 7A, 7B, 7D and 7F, the movable frame members 28, 30, 32 house or support or include a bulb seal 27 that circumscribes the periphery of the movable frame 26 and functions to seal against the fixed frame 16 and the inner surface of the fixed window panel 12 when the movable window is closed, as discussed below.

In the illustrated embodiment, the movable window unit 14 includes upper guide pins or elements or channel followers 34 and lower guide pins or element or channel followers 36 disposed at the upper and lower end regions of the vertical frame members 28. The guide elements 34, 36 are received in respective channels 38, 40 established along the side fixed frame members 18 and guide the movable window 14 as it is moved between its opened and closed positions. As can be seen in FIGS. 2, 5, 6 and 8, channels 38, 40 comprise generally vertical channel portions 38a, 40a with curved portions or regions 38b, 40b at the upper ends of the generally vertical channel portions 38a, 40a.

Thus, the movable window unit 14 is moved along and inward of the fixed window panel 12 when moved towards its opened position. As the movable window unit 14 is moved towards its closed position, the guide elements 34, 36 move along the curved end portions 38b, 40b of the channels 38, 40 to move the movable window panel towards the plane of the fixed window panel, such that when the movable window panel is fully closed, the outer surface 15c of movable window panel 15 is generally flush or coplanar with the outer surface 12c of fixed window panel 12, and both outer surfaces 12c, 15c may be generally flush with or coplanar with an outer surface 11d of the transit vehicle or school bus 11, such as can be seen with reference to FIGS. 7A and 7C-F. When the window is closed, the bulb seal 27 around the periphery of the movable window panel frame 26 is compressed against the upper fixed frame member 20 and the side fixed frame members 18 and the inner surface 12a at the upper perimeter region 12d of the fixed window panel 12 (or against the encapsulation or wrapping element 13 at the upper perimeter edge of the fixed window panel) to substantially seal the movable window panel in its closed position. For example, and as shown in FIGS. 7A-D, the seal 27 seals against flange 20a of upper frame member 20 and against flanges 18c of side frame members 18 and against fixed window panel 12 (or against wrapping element 13 at the upper perimeter edge region 12d of fixed window panel 12) to substantially seal the periphery of the movable window unit at the window assembly when the movable window unit is closed. When the movable window unit is moved towards its opened position, the bulb seal 27 moves away from the sealing flanges and does not slidingly engage the sealing flanges during such movement of the movable window unit.

Figure 6:
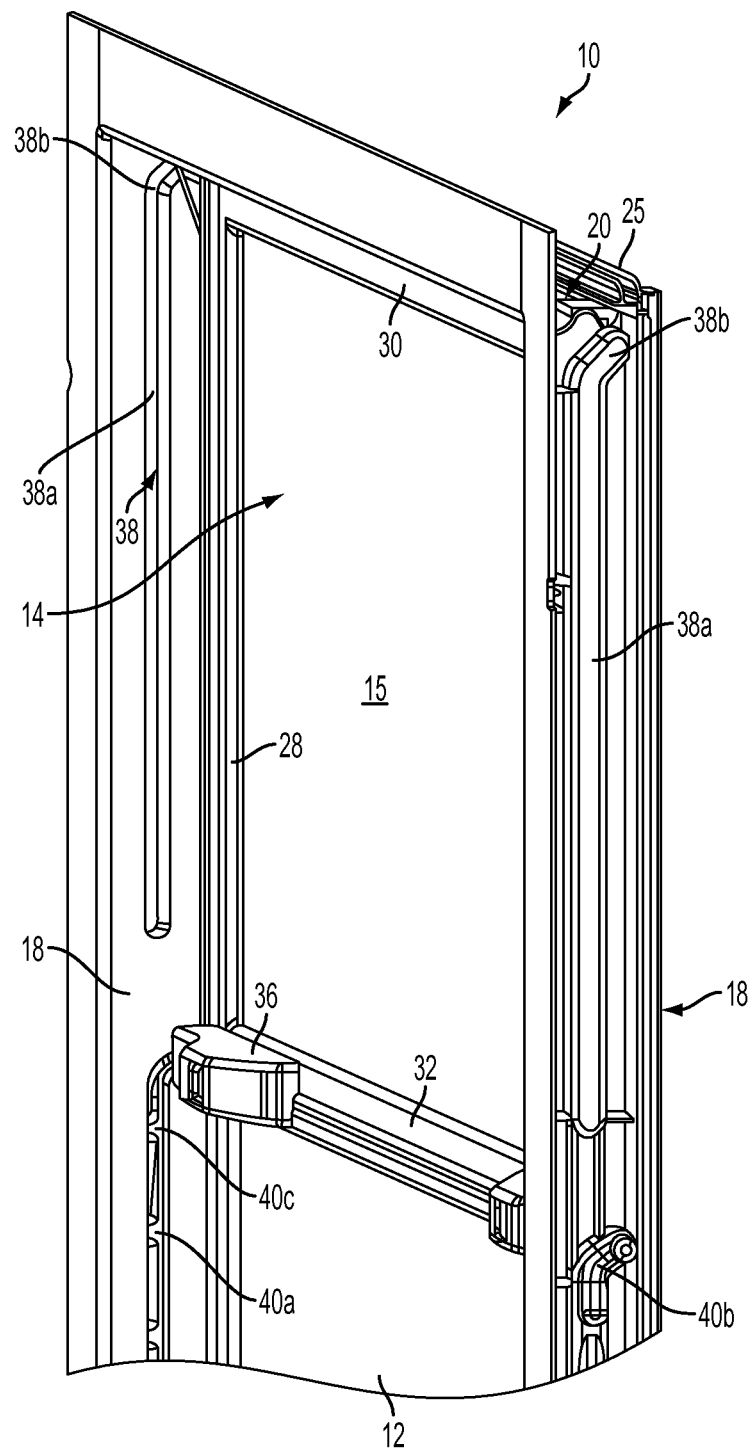
FIG. 6 is another perspective view of the window assembly of the present invention.

Optionally, and desirably, the movable window unit 14 may be selectively opened to and retained at multiple positions along the side frame members 18 and may be selectively retained at a selected or appropriate location or degree of opening. In the illustrated embodiment, the lower guide elements 36 comprise spring loaded pins 36a that are biased outwardly from the movable window frame and towards and into the respective channels 40 and move along the channels 40 as the movable window panel is moved between its opened and closed positions. As shown in FIGS. 6, 7E and 7F, the channels 40 include stops or recesses or indentations 40c established and spaced apart along the channels. The pins 36a are biased towards and received in the stops 40c to retain the movable window unit 14 in a desired or selected position.

In the illustrated embodiment, the movable window unit 14 includes a latching mechanism at each of the guide elements 36 that secures the movable window relative to the fixed rails and fixed window panel via insertion of the locking or detent pins 36a into the apertures or stops 40c along the fixed side frame members 18. In the illustrated embodiment, the guide pin 36a is part of a user actuatable releasing mechanism that retracts pin 36a from stops 40c responsive to a user pushing in an input element or button 36b. As shown in FIG. 7F, button 36b engages a pair of ramped portions 36c of a slidable or movable element 36d that is attached to pin 36a. When button 36b is pressed towards movable window panel 15, the ramped portions 36c move away from the side frames 18 as the button slides down the ramped portions 36c, whereby the element 36d and pin 36a are moved away from the side frames and towards the biasing element 36e of guide element 36. Thus, a user may readily retract or disengage the pin 36a from a stop 40c to allow for movement of the movable window unit along the side frames 18 between its opened and closed positions. When the user releases the button 36b, the biasing element 36e urges the pin 36a towards the channel 40 and into the stop or aperture 40c when the pin is generally aligned with the stop 40c. In the illustrated embodiment, the side frames 18 include multiple stops 40c spaced apart along channel 40 so that the movable window unit 14 may be retained at its fully closed position and at its fully opened position and at multiple locations between its fully closed and opened positions.

Optionally, the upper guide elements 34 may have spring loaded or biased pins that are biased towards and into the respective channels 38 to guide the movable window panel along the channels 38 as it is moved between its opened and closed positions. The biasing elements or springs at guide elements 34 and 36 may thus be at all four corners of the frame portion and thus may function to "float" the movable window unit between the side frame members, thus centering the movable window unit and reducing chucking movement when operating or opening/closing the movable window.

Thus, the window assembly of the present invention comprises a generally flush window assembly that, when installed at or mounted to a vehicle, has its outer window surfaces 12c, 15c generally flush with or generally coplanar with the outer surfaces of the vehicle sheet metal or body at and around the window opening of the vehicle. When installed at the vehicle 11, the window assembly is received in an opening formed at the vehicle and may be inserted into the opening from inside the vehicle. For example, and as can be seen with reference to FIGS. 7D-F, the window assembly 10 is inserted into the opening of the vehicle sheet metal 11b until a sealing flange 18d (and/or a bead of sealant 42, such as a butyl bead or tape or the like) at both of the side frame members 18 engages or seals against a respective flange 11e of the vehicle sheet metal 11b or body or frame of the vehicle 11 (such as an outer flange of a generally U-shaped bow or member of the vehicle frame or body or sheet metal). The flexible window seals and flexible rail seals may comprise any suitable material, such as, for example, a polypropylene material (PPE) or EPDM material, and/or may utilize aspects of the seals and seal materials described in U.S. Pat. Nos. 6,220,650; 6,299,235; 6,394,529; 6,572,176; and 6,729,674, which are hereby incorporated herein by reference in their entireties.

Figure 7D:
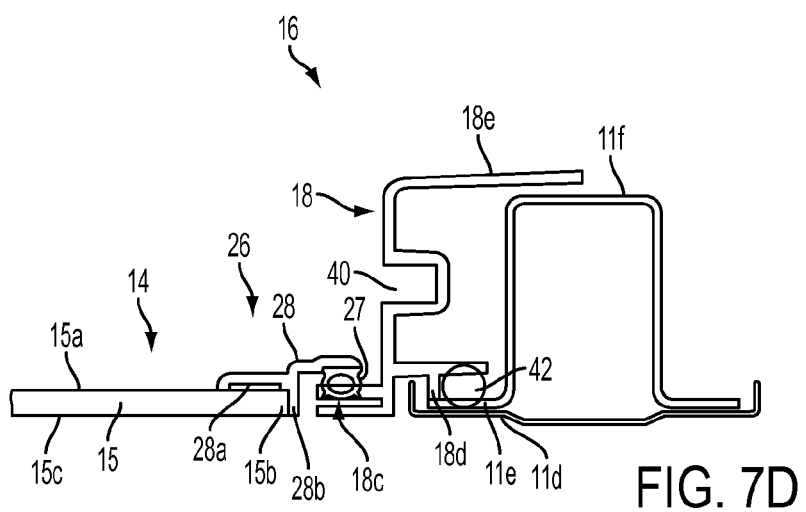
FIG. 7D is a sectional view of the vertical frame portions of the movable window and window assembly, taken along the line D-D in FIG. 7.
Figure 7E:
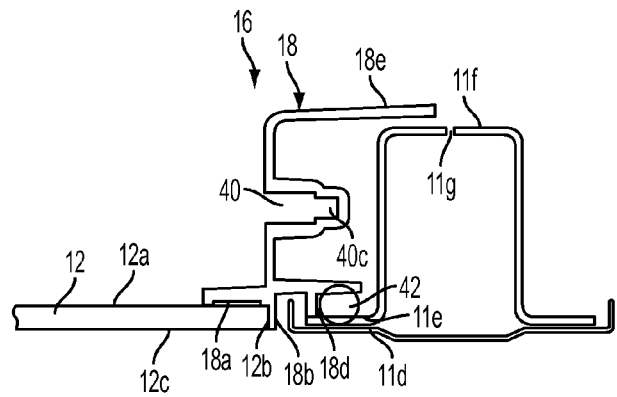
FIG. 7E is a sectional view of the vertical frame portion of the fixed window and window assembly, taken along the line E-E in FIG. 7.
Figure 7F:
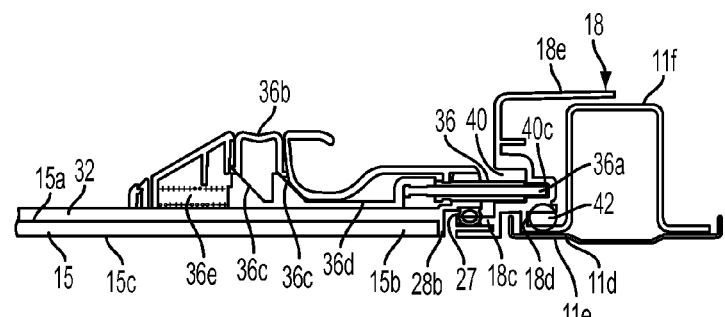
FIG. 7F is a sectional view of the vertical frame portions of the movable window and fixed window and window assembly, taken along the line F-F in FIG. 7.
Figure 8:
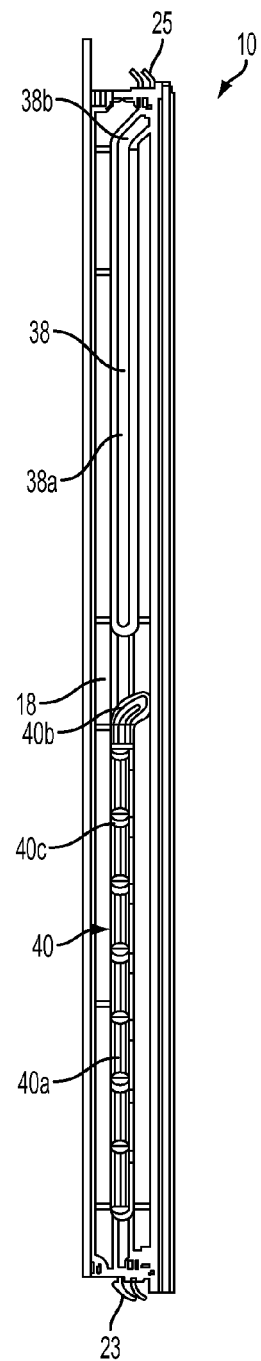
FIG. 8 is a side elevation of the window assembly of the present invention.

When the side frame members 18 are positioned at the vehicle body in this manner, an attaching or mounting flange 18e of side frame members 18 may be disposed at an inner surface 11f of the vehicle sheet metal (such as at an inboard surface of a generally U-shaped member of the vehicle as shown in FIGS. 7D-F), whereby a bracket or attaching or clamping element (not shown) may be attached at the inner surface 11f (such as via a fastener that secures the bracket to the sheet metal via threading into an aperture or hole 11g (FIG. 7E)) and may clamp the flange 18e of side frame member 18 between the bracket and the sheet metal to substantially affix or attach the window assembly at the vehicle 11. Similarly, the upper and/or lower frame members 20, 22 may be disposed at the lower and upper vehicle body or frame or sheet metal portions 11c, 11a, with the double lip seals engaging and sealing against the vehicle body or frame or sheet metal portions. When the movable window unit is disposed at the opening, an attaching flange 22d (only partially shown in FIG. 7C) of upper frame member 22 may overlay an inner surface of the vehicle frame portion and may be clamped thereto or otherwise fastened thereto or thereat to secure the upper window portion at the vehicle. Similarly, when the movable window unit is disposed at the opening, an attaching flange 20c of upper frame member 20 may overlay an inner surface of the vehicle frame portion and may be clamped thereto or otherwise fastened thereto or thereat to secure the upper window portion at the vehicle. As shown in FIG. 7A, a drip molding or element 11h may be disposed at the vehicle to direct water and the like away from the upper portion of the window assembly to limit water intrusion into the vehicle at the upper frame member of the window assembly.

Thus, the present invention provides a movable window assembly with a movable window that is moved along side frames or rails between an opened and closed position relative to a fixed window panel and aperture or opening, with the glass window panels bonded to the respective frames or frame portions (such as by utilizing aspects of the window assemblies described in PCT Application No. PCT/US2011/051506, filed Sep. 13, 2011 and published Mar. 22, 2012 as International Publication No. WO2012/037190; U.S. Pat. Nos. 7,838,115; 7,332,225; 6,846,039; 6,319,344; 6,068,719;

and 5,853,895, which are all hereby incorporated herein by reference in their entireties). The window assembly may be installed or inserted at a vehicle body opening from inside the vehicle and may be secured or retained at the vehicle body via a plurality of clamping elements that clamp or sandwich portions of the window frame at the inner portions or surfaces of the vehicle body or sheet metal. The periphery of the movable window panel and at least part of the periphery of the fixed window panel may include an opaque layer (such as a ceramic frit layer or the like) to substantially hide or conceal the bonding portions of the respective frames from view to a person viewing the window assembly from outside of the vehicle or school bus.

Therefore, the present invention provides a window assembly or multiple window assemblies for installation at or attachment to the sides of a vehicle, such as a school bus or the like. The window assemblies are modular window assemblies that may be readily attached to the school bus. The fixed window panel is bonded along its side and lower perimeter regions to a fixed frame and the movable window panel is bonded to a circumferential or peripheral frame that is slidable or movable along the side frame members of the fixed frame and is movable to a closed position where the movable window panel is generally flush with or coplanar with the fixed window panel. The window assembly thus provides a generally flush window assembly that may be generally flush with or generally coplanar with the outer surface of the transit vehicle when the movable window assembly is installed at or mounted to the side of a transit vehicle or school bus.

Changes and modifications to the specifically described embodiments may be carried out without departing from the principles of the present invention, which is intended to be limited only by the scope of the appended claims as interpreted according to the principles of patent law.

The invention claimed is:

1. A window assembly for a vehicle, said window assembly comprising:
   a frame configured to mount to a vehicle;
   a fixed window panel bonded to a lower portion of said frame;
   a movable window assembly comprising a movable window panel circumscribed by a movable frame, said movable frame having opposite side frame members and upper and lower generally horizontal frame members, wherein said movable window assembly is movable relative to said fixed window panel and said frame between an opened position and a closed position;
   wherein each of said side frame members includes upper and lower guide elements that are slidably received in respective channels along opposite portions of said frame;
   wherein said channels are configured to move said movable window assembly along said fixed window panel when said movable window assembly is at least partially opened and to move said movable window assembly to a position where said movable window panel is generally coplanar with said fixed window panel when said movable window assembly is in its closed position; and
   wherein, when said movable window assembly is in its closed position, a seal of said movable window assembly sealingly engages an inboard surface of said side frame members and an inboard surface of said upper frame member and an inboard portion of an upper perimeter region of said fixed window panel.

2. The window assembly of claim 1, wherein said movable window assembly is vertically movable relative to said frame and said fixed window panel when said window assembly is mounted at the vehicle.

3. The window assembly of claim 1, wherein said movable frame is bonded about the periphery of an inner surface of said movable window panel and does not overlap or overlay an outer surface of said movable window panel.

4. The window assembly of claim 1, wherein said lower portion of said frame is bonded at an inner surface of said fixed window panel and does not overlap or overlay an outer surface of said fixed window panel.

5. The window assembly of claim 1, wherein said movable window assembly is retainable in a selected one of a plurality of positions between said opened and closed positions.

6. The window assembly of claim 1, wherein said seal of said movable window assembly comprises a bulb seal.

7. The window assembly of claim 1, wherein said frame is secured to the sheet metal of the vehicle via a plurality of clamping elements that clamp a flange of said frame at an inner surface of the vehicle sheet metal.

8. The window assembly of claim 1, said fixed window panel is bonded to said frame such that no portion of said frame overlaps an outer surface of said fixed window panel.

9. The window assembly of claim 1, wherein said movable window panel is bonded to said movable frame such that no portion of said movable frame overlaps an outer surface of said movable window panel.

10. The window assembly of claim 1, wherein said inboard portion of said upper perimeter region of said fixed window panel comprises an inboard surface of a guard element that is disposed along said upper perimeter region of said fixed window panel to substantially encapsulate the upper perimeter edges of said fixed window panel.

11. The window assembly of claim 1, wherein said window assembly is configured to mount at a side of a bus.

12. A side window assembly for a school bus, said side window assembly comprising:
    a frame configured to mount at a side of a school bus;
    a fixed window panel bonded to a lower portion of said frame;
    a movable window assembly comprising a movable window panel circumscribed by a movable frame, said movable frame having opposite side frame members and upper and lower generally horizontal frame members, wherein said movable window assembly is vertically movable relative to said fixed window panel and said frame between an opened position and a closed position;
    wherein said movable frame is bonded about the periphery of an inner surface of said movable window panel and does not overlap or overlay an outer surface of said movable window panel;
    wherein said side frame members include upper and lower guide elements that are slidably received in respective channels along opposite portions of said frame;
    wherein said channels are configured to move said movable window assembly along said fixed window panel when said movable window assembly is at least partially opened and to move said movable window assembly to a position where said movable window panel is generally coplanar with said fixed window panel when said movable window assembly is in its closed position; and
    wherein, when said movable window assembly is in its closed position, a seal of said movable window assembly sealingly engages an inboard surface of said side frame members and an inboard surface of said upper frame member and an inboard portion of an upper perimeter region of said fixed window panel.

13. The side window assembly of claim 12, wherein said lower portion of said frame is bonded at an inner surface of said fixed window panel and does not overlap or overlay an outer surface of said fixed window panel.

14. The side window assembly of claim 12, wherein said movable window assembly is retainable in a selected one of a plurality of positions between said opened and closed positions.

15. The side window assembly of claim 12, wherein said seal of said movable window assembly comprises a bulb seal.

16. The side window assembly of claim 12, wherein said frame is secured to the sheet metal of the school bus via a plurality of clamping elements that clamp a flange of said frame at an inner surface of the sheet metal of the school bus.

17. The side window assembly of claim 12, said fixed window panel is bonded to said frame such that no portion of said frame overlaps an outer surface of said fixed window panel.

18. The side window assembly of claim 12, wherein said inboard portion of said upper perimeter region of said fixed window panel comprises an inboard surface of a guard element that is disposed along said upper perimeter region of said fixed window panel to substantially encapsulate the upper perimeter edges of said fixed window panel.

19. A window assembly for a vehicle, said window assembly comprising:
 a frame configured to mount at a side of a vehicle;
 a fixed window panel bonded to a lower portion of said frame;
 wherein said fixed window panel is bonded to said frame such that no portion of said frame overlaps an outer surface of said fixed window panel;
 a movable window assembly comprising a movable window panel circumscribed by a movable frame, said movable frame having opposite side frame members and upper and lower generally horizontal frame members, wherein said movable window assembly is vertically movable relative to said fixed window panel and said frame between an opened position and a closed position;
 wherein said movable frame is bonded about the periphery of an inner surface of said movable window panel and does not overlap or overlay an outer surface of said movable window panel;
 wherein said side frame members include upper and lower guide elements that are slidably received in respective channels along opposite portions of said frame;
 wherein said channels are configured to move said movable window assembly along said fixed window panel when said movable window assembly is at least partially opened and to move said movable window assembly to a position where said movable window panel is generally coplanar with said fixed window panel when said movable window assembly is in its closed position; and
 wherein, when said movable window assembly is in its closed position, a seal of said movable window assembly sealingly engages an inboard surface of said side frame members and an inboard surface of said upper frame member and an inboard portion of an upper perimeter region of said fixed window panel.

20. The window assembly of claim 19, wherein said movable window assembly is retainable in a selected one of a plurality of positions between said opened and closed positions.

* * * * *